United States Patent
Fly et al.

(10) Patent No.: US 6,566,004 B1
(45) Date of Patent: May 20, 2003

(54) FUEL CELL WITH VARIABLE POROSITY GAS DISTRIBUTION LAYERS

(75) Inventors: Gerald W. Fly, Geneseo, NY (US); Brian K. Brady, North Chili, NY (US)

(73) Assignee: General Motors Corporation, Detroit, MI (US)

(*) Notice: Subject to any disclaimer, the term of this patent is extended or adjusted under 35 U.S.C. 154(b) by 6 days.

(21) Appl. No.: 09/651,934

(22) Filed: Aug. 31, 2000

(51) Int. Cl.⁷ .................................. H01M 8/04
(52) U.S. Cl. .............. 429/39; 429/34; 429/38
(58) Field of Search ............... 429/12, 34–40

(56) References Cited

U.S. PATENT DOCUMENTS

| | | |
|---|---|---|
| 4,125,676 A | 11/1978 | Maricle et al. |
| 4,129,685 A | 12/1978 | Damiano ............ 429/38 |
| 4,664,988 A * | 5/1987 | Shigeta et al. ......... 429/34 |
| 5,316,871 A | 5/1994 | Swathirajan et al. |
| 5,508,128 A | 4/1996 | Akagi |
| 5,620,807 A | 4/1997 | Mussell et al. |
| 5,641,586 A | 6/1997 | Wilson ............... 429/30 |
| 5,658,681 A | 8/1997 | Sato et al. |
| 5,707,755 A | 1/1998 | Grot |
| 5,776,624 A | 7/1998 | Neutzler |
| 5,798,187 A | 8/1998 | Wilson et al. ......... 429/26 |
| 6,017,650 A | 1/2000 | Ramunni et al. |
| 6,024,848 A * | 2/2000 | Dufner et al. ......... 204/252 |
| 6,037,072 A | 3/2000 | Wilson et al. ......... 429/33 |
| 6,037,073 A * | 3/2000 | Besmann et al. ....... 429/34 |
| 6,110,614 A | 8/2000 | Fellows ............... 429/19 |
| 6,132,895 A | 10/2000 | Pratt et al. |
| 6,146,780 A | 11/2000 | Cisar et al. ........... 429/34 |
| 6,232,010 B1 | 5/2001 | Cisar et al. |
| 6,258,476 B1 * | 7/2001 | Cipollini ............. 429/12 |
| 6,379,833 B1 | 4/2002 | Hill et al. |

FOREIGN PATENT DOCUMENTS

| | | | |
|---|---|---|---|
| DE | 196 26 342 A1 | 8/1998 | ............ H01M/4/88 |
| JP | 3-167752 | 7/1991 | ............ H01M/4/86 |
| WO | WO 94/09519 | 10/1992 | ............ H01M/2/00 |
| WO | WO 98/16961 | 10/1997 | ............ H01M/8/04 |

(List continued on next page.)

OTHER PUBLICATIONS

International Search Report mailed Jul. 11, 2002.
International Search Report PCT/US02/07981, report mailed Aug. 28, 2002.

*Primary Examiner*—Carol Chaney
(74) *Attorney, Agent, or Firm*—Karl F. Barr, Jr.; Cary W. Brooks; Linda M. Deschere (57) ABSTRACT

A proton exchange membrane fuel cell comprising a proton transmissive membrane, a catalytic anode layer on one face of the membrane, a catalytic cathode layer on the other face of the membrane, and a gas distribution layer on each of the cathode and anode layers defining a gas flow field extending over each of the catalytic layers. Each of the gas distribution layers comprises a layer of open cell conductive foam material which is divided into a plurality of generally parallel segments extending from one edge of the fuel cell to an opposite edge of the fuel cell whereby to define a plurality of generally parallel porous reactant paths extending across each catalytic layer. The segments may be defined by selectively varying the porosity of the foam material or selectively varying the thickness of the foam material. Reactant gases are delivered to the foam gas distribution layers via a manifold structure in which the reactant gases are moved upwardly along an edge of the fuel cell stack in parallel paths and selectively distributed within the stack at the desired cathode or anode levels by selective baffling and partitioning structures. A coolant layer may also be provided utilizing the same segmented foam construction utilized in the anode and cathode layers. The resultant fuel cell is lighter, smaller, and less expensive than prior art cells having comparable per surface area unit electrical energy output.

21 Claims, 9 Drawing Sheets

FOREIGN PATENT DOCUMENTS

| | | | |
|---|---|---|---|
| WO | WO 98/21770 | 11/1997 | ............ H01M/8/04 |
| WO | WO 99/56333 | 4/1999 | ............ H01M/8/02 |
| WO | WO 99/57781 | 4/1999 | ............ H01M/8/24 |
| WO | WO 00/02267 | 7/1999 | |
| WO | WO 00/02274 | 7/1999 | |
| WO | WO 00/02275 | 7/1999 | |
| WO | WO 00/02276 | 7/1999 | |
| WO | WO 00/02281 | 7/1999 | ............ H01M/8/00 |
| WO | WO 02/05373 A1 | 1/2002 | |

* cited by examiner

FUEL CELL WITH VARIABLE POROSITY GAS DISTRIBUTION LAYERS

FIELD OF THE INVENTION

This invention relates to a fuel cell system and more particularly to a system having a plurality of cells which consume an $H_2$-rich gas to produce power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX, carbon dioxide ($CO_2$) is produced from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,422 and 08/980,087, filed in November, 1997, and U.S. Ser. No. 09/187,125, filed in November, 1998, and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

The electrically conductive elements sandwiching the MEAs may contain an array of grooves in the faces thereof for distributing the fuel cell's gaseous reactants (i.e., hydrogen and oxygen in the form of air) over the surfaces of the respective cathode and anode. In the fuel cell stack, a plurality of cells are stacked together in electrical series while being separated one from the next by a gas impermeable, electrically conductive bipolar plate. Heretofore, the bipolar plate has served several functions including (1) as an electrically conductive gas separator element between two adjacent cells; (2) to distribute reactant gases across substantially the entire surface of the membrane; (3) to conduct electrical current between the anode of one cell and the cathode of the next adjacent cell in the stack; (4) to keep the reactant gases separated in order to prevent auto ignition; (5) to provide a support for the proton exchange membrane; and (6) in most cases to provide internal cooling passages therein defined by internal heat exchange faces and through which a coolant flows to remove heat from the stack. The bipolar plate also accommodates the gas pressure loads associated with the reforming process as well as the compression loads on the plates. For example, the plate includes a plurality of channels on one side and a plurality of channels on the other side with the channels on an individual side being separated by lands. The arrangement of the lands and the channels on both sides has to be such that the bipolar plate can withstand the compression loads so that the lands and the channels are arranged so that they do not collapse or warp the bipolar plate. The bipolar plate includes serpentine channels to deliver the hydrogen and oxygen to a proton exchange membrane assembly overlying the bipolar plates. A piece of graphite paper is placed over the serpentine channels to prevent the membrane from collapsing down into the channel and blocking the flow of gas and to provide an electrical conduction path to the bipolar plate from the area of the membrane which overlays the channel.

The bipolar plates may be made from metal but the plates can also be manufactured from other materials. For example, bipolar plates are often fabricated from graphite which is lightweight (compared to traditional metal plates), corrosion resistant and electrically conductive in the PEM fuel cell environment. However, graphite is quite brittle which makes it difficult to handle mechanically and has a relatively low electrical and thermal conductivity compared to metals. Finally, graphite is quite porous making it virtually impossible to make very thin gas impervious plates which is desired for low weight, low volume, low internal resistant fuel cell stacks.

Neutzler, U.S. Pat. No. 5,776,624, discloses a metal bipolar plate and PEM assembly of this channel type. These prior art bipolar plates and PEM assemblies are heavy, bulky, difficult to produce and assemble, and costly to manufacture.

By contrast, efficient operation of a fuel cell system depends on the ability of the fuel cell to generate a significant amount of electrical energy for a given size, weight, and cost of the fuel cell. Maximizing the electrical energy output of the fuel cell for a given size, weight, and cost is especially important in motor vehicle applications where size, weight, and cost of all vehicular components are especially critical to the efficient manufacture and operation of the vehicle. Therefore it is desirable, especially for motor vehicle applications, to provide a fuel cell construction which will generate an increased amount of electrical energy for a given size, weight, and cost of the fuel cell.

SUMMARY OF THE INVENTION

The invention relates to a proton exchange membrane fuel cell comprising a proton transmissive membrane, a catalytic anode layer on one face of the membrane, a catalytic cathode layer on the other face of the membrane, and a gas distribution layer on each of the cathode and anode layers defining a gas flow field extending over each of the catalytic members with the membrane catalytic layers and distribution layers forming a sandwich construction having first and second opposite edges.

According to the invention, each of the gas distribution layers comprises a conductive porous media divided into a plurality of generally parallel segments each extending from the first edge to the second edge of the sandwich construction whereby to define a plurality of generally parallel porous reactant paths extending across each catalytic layer. This arrangement ensures that little or no cross migration occurs between the parallel segments whereby to ensure an essentially uniform distribution of the gases across the surface of the catalytic layers.

According to a further feature of the invention, the porous media comprises a foam media. The use of a foam media further contributes to the inexpensive lightweight aspects of the invention arrangement. In the disclosed embodiment of the invention, the foam media comprises an open cell foam media.

According to a further feature of the invention, each gas distribution layer comprises a sheet of the porous media and the segments of each distribution layer are defined by spatially varying the resistance to gaseous flow offered by the respective sheet. This arrangement provides a simple and inexpensive means of providing the individual parallel segments of the porous media. In one embodiment of the invention, the resistance to flow is spatially varied by spatially varying the porosity of the respective sheet; in another embodiment, the resistance to flow is spatially varied by spatially varying the thickness of the respective sheet; and in a further embodiment, the resistance to flow is spatially varied by spatially varying the thickness and the porosity of the respective sheet.

According to a further feature of the invention, the foam media comprises either a conductive graphite foam media or a conductive metallic foam media. The use of these relatively inexpensive conductive foam medias further contributes to the reduction in cost of the fuel cell without any sacrifice in performance.

According to a further feature of the invention, applicable to a fuel cell stack including a plurality of stacked fuel cells, the fuel cell stack further includes a manifold structure including a manifold strip positioned along each of the inlet and outlet edges of the porous sheets of each fuel cell and operative to deliver a reactant gas to an inlet end of each segment of each sheet of each fuel cell and to receive a reactant gas from an outlet end of each segment of each sheet of each fuel cell. This manifolding arrangement contributes to the efficient operation of the segmented gas distribution layers without adding significantly to the weight, cost, or size of the fuel cell arrangement.

According to a further feature of the invention, the manifold structure includes an inlet manifold strip positioned along the inlet ends of the segments of each sheet of each fuel cell and an outlet manifold strip positioned along the outlet ends of the segments of each sheet of each fuel cell; each inlet manifold strip includes an outboard edge and inboard edge positioned proximate the inlet ends of the respective segments; an outboard portion of each inlet strip proximate the outboard edge thereof defines a plurality of serially arranged vertical inlet passages for delivery of respective fluids, including reactant gases, to the respective segments; an inboard portion of each inlet strip proximate the inboard edge thereof defines a horizontal passage communicating with the inlet ends of the segments of the respective sheet; certain of the inlet strips include passage means between one of the vertical inlet passages and the horizontal passage while blocking communication between the remaining vertical inlet passages and the horizontal passage, whereby to deliver a first reactant gas to the inlet ends of the segments of the respective sheet through the one inlet passage and the horizontal passage; and certain other of the inlet strips include passage means between another of the vertical inlet passages and the horizontal passage while blocking communication between the remaining vertical inlet passages and the horizontal passage, whereby to deliver a second reactant gas to the inlet ends of the segments of the respective sheet through the other inlet passage and the horizontal passage. This specific manifolding arrangement allows the various reactant gases to be selectively and efficiently delivered to the various layers of the fuel cell stack and selectively and efficiently removed from the fuel cell stack.

According to a further feature of the invention, the fuel cell stack further includes coolant layers between at least certain of the fuel cells; an inlet manifold strip is positioned along an inlet edge of each coolant layer and an outlet manifold strip is positioned along an outlet edge of each coolant layer; and the inlet manifold strip positioned along the inlet edge of each coolant layer includes passage means between a further vertical inlet passage and the horizontal passage while blocking communication between the remaining inlet passages and the horizontal passage, whereby to deliver a cooling fluid to the coolant layer through the further inlet passage and the horizontal passage. This specific manifolding arrangement further allows a coolant fluid to be selectively delivered to and removed from the coolant layers interspersed between the fuel cell.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
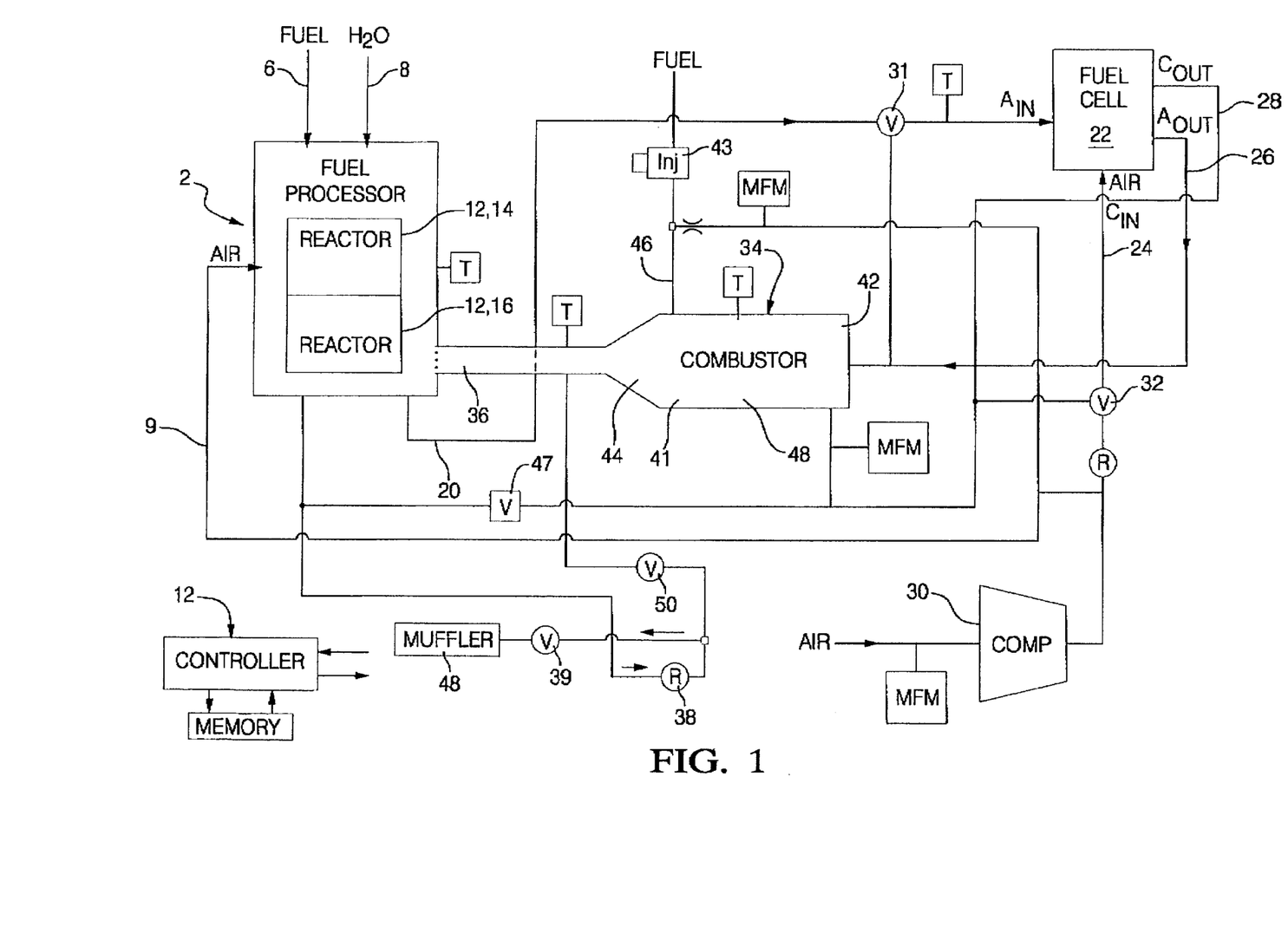
FIG. 1 is a schematic view of a fuel cell system incorporating a fuel cell according to the invention.

The invention may be further understood with reference to the fuel cell system shown in FIG. 1 by example only. Therefore, before further describing the invention, it is useful to understand the system within which the improved fuel cell of the invention operates.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich or relatively high hydrogen content.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produce carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. Then, during running mode, the $H_2$ rich reformate 20 is fed through valve 31 into the anode chamber of a fuel cell stack 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by an air supply, preferably compressor 30. Air from the air supply (compressor 30) is directed to the fuel cell 22 by a valve 32 under normal operating conditions. During start-up, however, the valve 32 is actuated to provide air directly to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat be added. This is typically accomplished by preheating reactants, fuel 6, steam 8, and air 9 and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with an inlet and an outlet.

Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits release of the combustor exhaust 36 to atmosphere when it is not needed to heat reactors in the fuel processor 2.

As can be seen, the hydrocarbon fuel stream 46 supplements the anode effluent 26 as fuel for the combustor 34, as may be needed, to meet the transient and steady state needs of the fuel cell apparatus. In some situations, exhaust gas passes through a regulator 38, a shutoff valve 39 and a muffler 48 before being released to the atmosphere. In FIG. 1, the symbols are as follows: V is valve, MFM is mass flow meter, T is temperature monitor, R is regulator, C is cathode side, A is anode side of fuel cell, INJ is injector, and COMP is compressor.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air is also used in the fuel processor reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and the combustor 34 ultimately satisfies the heat demanded by the fuel processor 2. The oxygen or air provided to the combustor 34 includes one or both of cathode effluent exhaust 28, which is typically a percentage of the total oxygen supplied to the cathode of the fuel cell 22, and a compressor output air stream depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and the process includes the following: (1) valve 32 is activated to direct air to the cathode side of the fuel cell 22; (2) fuel and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel, air, cathode effluent 28 and anode effluent 26 are burned in the combustor 34. In a preferred sequence, step (2) is implemented first along with the supplying of air directly to the combustor. Then, when the hydrogen-rich stream has adequately low CO level, steps (1) and (3) are implemented, followed by steps (4), (5) and (6).

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to supplement the Aout (26) to the combustor 34. It can be seen that the combustor 34 receives multiple fuels, such as a hydrocarbon fuel as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 52 shown in FIG. 1 controls various aspects of the operation of the system shown in FIG. 1. The controller 52 may comprise any suitable microprocessor, microcontroller, personal computer, etc., which has central processing unit capable of executing a control program and data stored in a memory. The controller 52 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
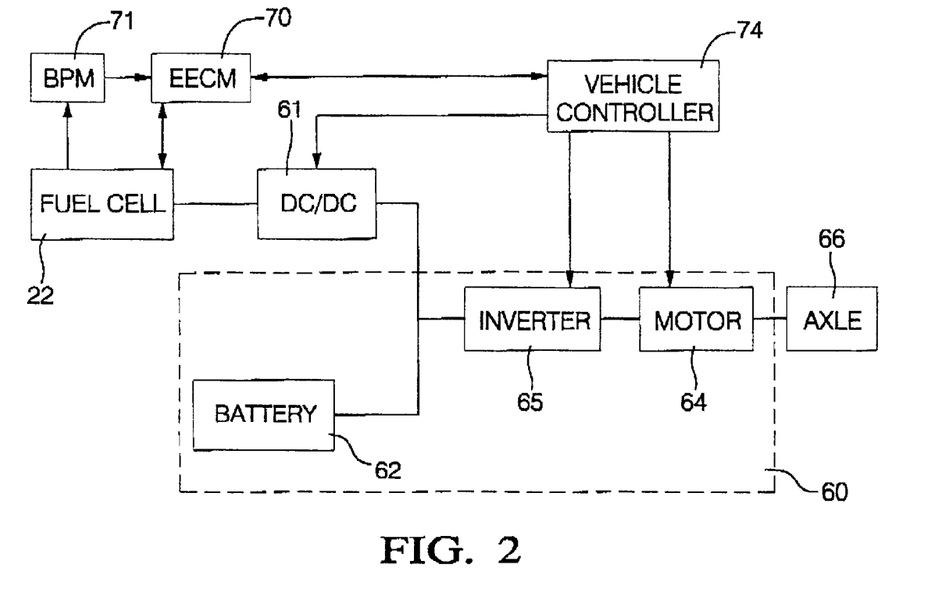
FIG. 2 is a schematic view of the fuel cell shown in FIG. 1 connected in a pictorial representation of a motor vehicle application.

In a preferred embodiment, the fuel cell system comprises the fuel cell 22 as part of a vehicle propulsion system 60 (see FIG. 2). Here, a portion of the system 60, comprises a battery 62, an electric motor 64, and associated drive electronics including inverter 65 constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative braking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics including inverter 65, the DC/DC converter 61, and requests a power level from the EECM 70.

Figure 3:
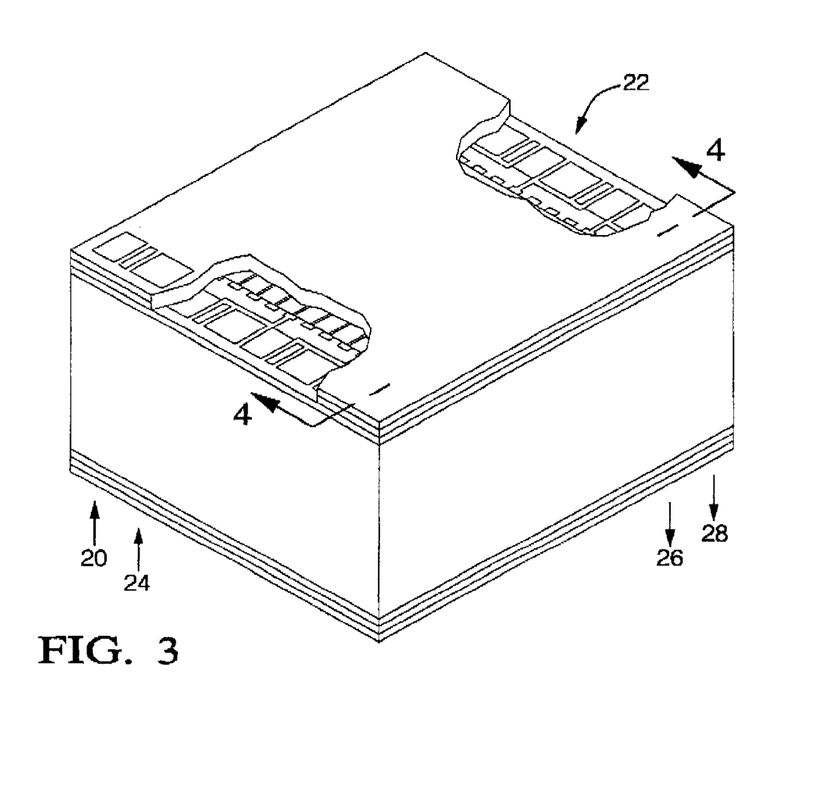
FIG. 3 is a schematic perspective view of a fuel cell stack according to the invention.

The present invention concerns fuel cell 22 and particularly the construction of the fuel cell whereby the fuel cell may be made lighter, smaller, and less expensively without a sacrifice in performance. The invention fuel cell is seen schematically and perspectively in FIG. 3 and in schematic cross section in FIG. 4. Broadly considered, reformate 20 and air 24 are delivered to the fuel cell stack in the manner previously described and oxygen depleted air 28 and hydrogen effluent 26 are exhausted from the stack.

Figure 4:
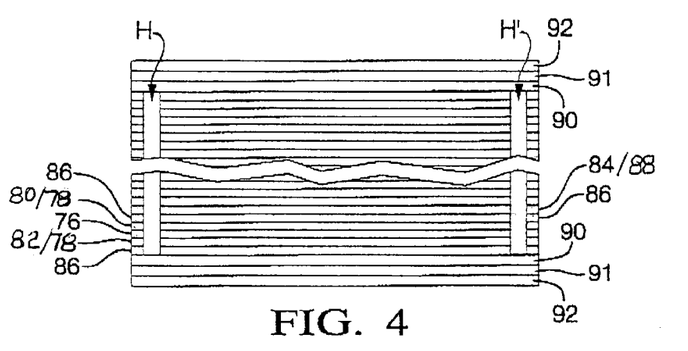
FIG. 4 is a cross-sectional view taken on line 4—4 of FIG. 3.

In overview, the stack includes a plurality of MEAs 76, a plurality of gas distribution layers 78, a plurality of anode manifolds 80, a plurality of cathode manifolds 82, a plurality of cooling manifolds 84, a plurality of shims or separator plates 86, a plurality of cooling layers 88, upper and lower collector plates 90, upper and lower insulator plates 91, and upper and lower end plates 92, all arranged in stacked relation as seen in FIG. 4.

Specifically, an end plate 92 forms the base or bottom of the stack; an insulator plate 91 is positioned over end plate 92; a collector plate 90 is positioned over insulator plate 91; a shim 86 is positioned over collector plate 88; a cathode manifold 82 enclosing a gas distribution layer 78 is positioned over shim 86; an MEA 76 is positioned over the cathode manifold/gas distribution layer; an anode manifold 80 enclosing a gas distribution layer 78 is positioned over the MEA; a shim 86 is positioned over the anode manifold; a cooling manifold 84 enclosing a cooling layer 88 is positioned over the shim 86; a further shim 86 is positioned over the cooling manifold and the sequence is repeated to provide as many cells as desired with the stack topping out with a top collector plate 90, an insulator plate 91 positioned over the collector 90, and a top end plate 92 positioned over the insulator plate 91. All of the members have a generally rectangular configuration and the number of the cells in the stack is determined by the desired voltage output for the fuel cell.

Figure 5:
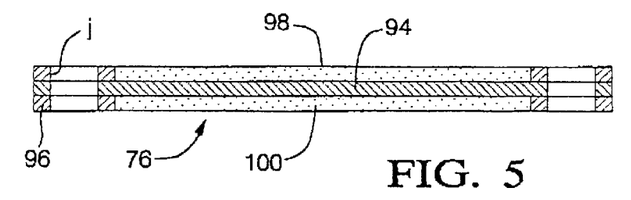
FIG. 5 is a cross-sectional view of an MEA utilized in the fuel cell.

Each MEA 76 (FIG. 5) includes a membrane 94 in the form of a thin proton transmissive non-electrically conductive solid polymer electrolyte, a seal or gasket frame member 96 positioned against the lower face of the membrane, a further seal or gasket 96 positioned against the upper face of the membrane, an anode catalyst layer 98 on the upper face of the membrane within the upper gasket 96, and a cathode catalyst layer on the lower face of the membrane within the lower gasket 96. A plurality of repeated sets of passages h, i, and j (FIG. 6) are provided along each longitudinal edge of the MEA.

Each gas distribution layer or sheet 78 is divided into a plurality of generally parallel segments 78a each extending from a first edge or minor face 78b of the layer to a second edge or minor face 78c of the layer whereby to define a plurality of generally parallel porous reactant paths extending across each catalytic layer. The segments of each distribution layer are defined by spatially varying the resistance to gaseous flow offered by the respective sheet. The resistance to flow may be spatially varied by spatially varying the porosity of the respective sheet, spatially varying the thickness of the respective sheet, or spatially varying both the thickness and the porosity of the sheet.

Each gas distribution layer or sheet 78 is divided into a plurality of generally parallel segments 78a each extending from a first edge 78b of the layer to a second edge 78c of the layer whereby to define a plurality of generally parallel porous reactant paths extending across each catalytic layer. The segments of each distribution layer are defined by spatially varying the resistance to gaseous flow offered by the respective sheet. The resistance to flow may be spatially varied by spatially varying the porosity of the respective sheet, spatially varying the thickness of the respective sheet, or spatially varying both the thickness and the porosity of the sheet.

Figure 7:
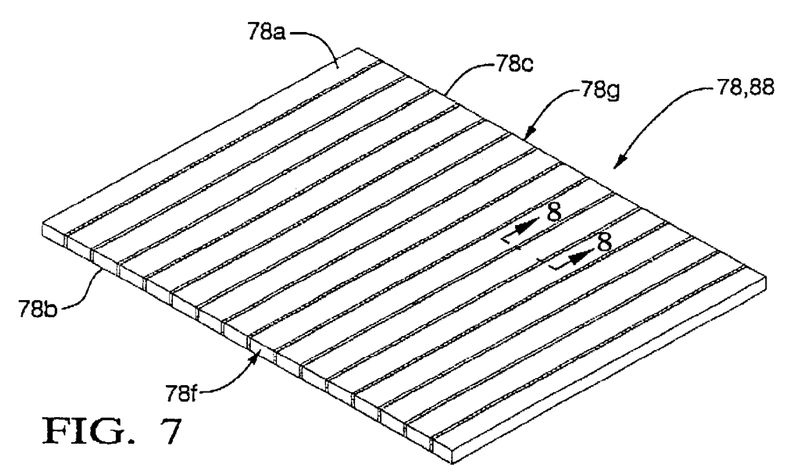
FIG. 7 is a perspective view of a gas distribution layer utilized in the fuel cell.
Figure 8:
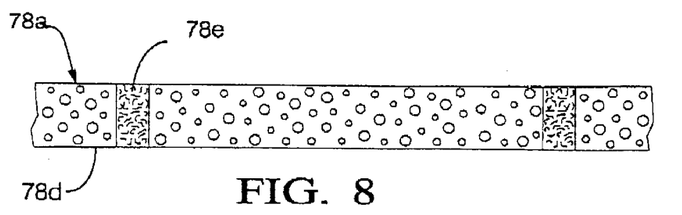
FIG. 8 is a cross-sectional view taken on line 8—8 of FIG. 7.
Figure 9:
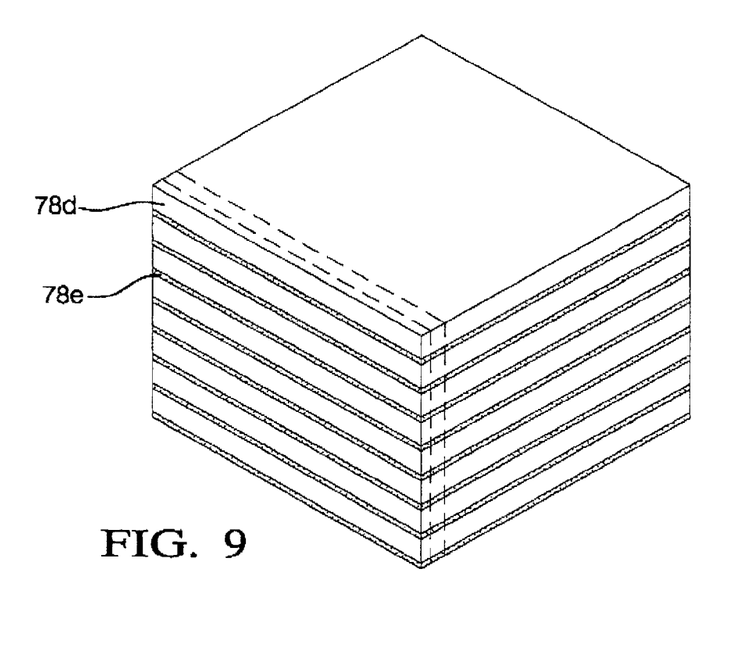
FIG. 9 illustrates a methodology for forming the gas distribution layer of FIG. 7.

In the preferred construction of the gas distribution layer seen in FIGS. 7, 8, and 9, the porosity is spatially varied by spatially varying the porosity of the sheet and specifically, the sheet is made up in composite form including alternate relatively wide strips 78d of a high porosity foam material alternating with narrow strips 78e of a relatively low porosity foam material. The gas distribution layers 78 may be formulated (as seen in FIG. 9) by building up a block of alternate high porosity and low porosity foam layers and then slicing off sections of the block (as seen in dash lines in FIG. 9), to form the individual sheets of the gas distribution layer.

Figure 10:
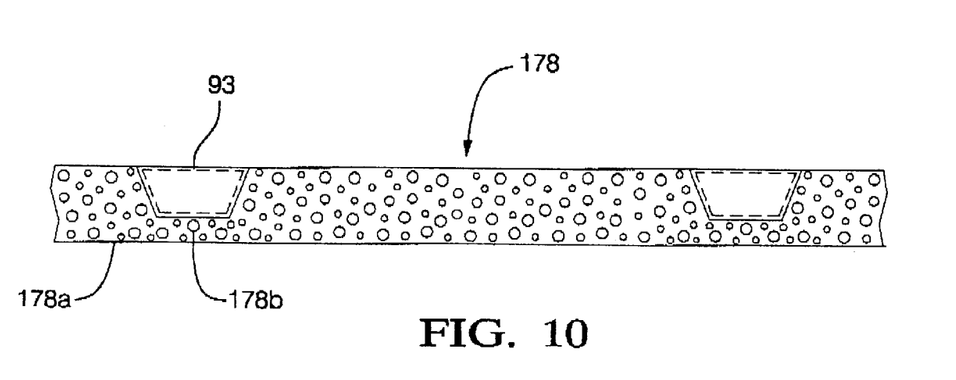
FIGS. 10 and 11 illustrate alternate forms of the gas distribution layer.
Figure 11:
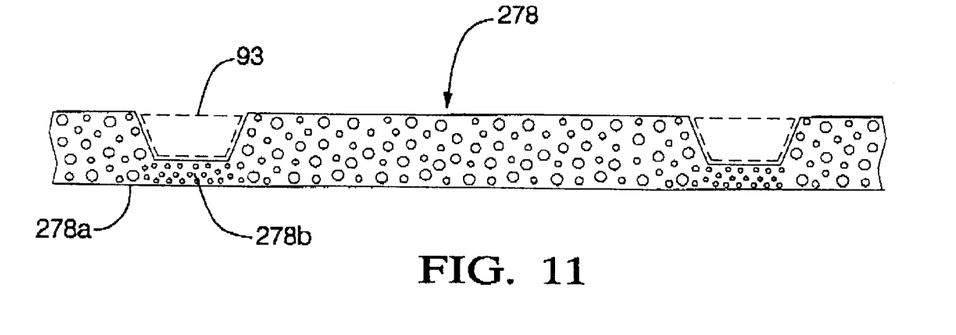
Figure 12:
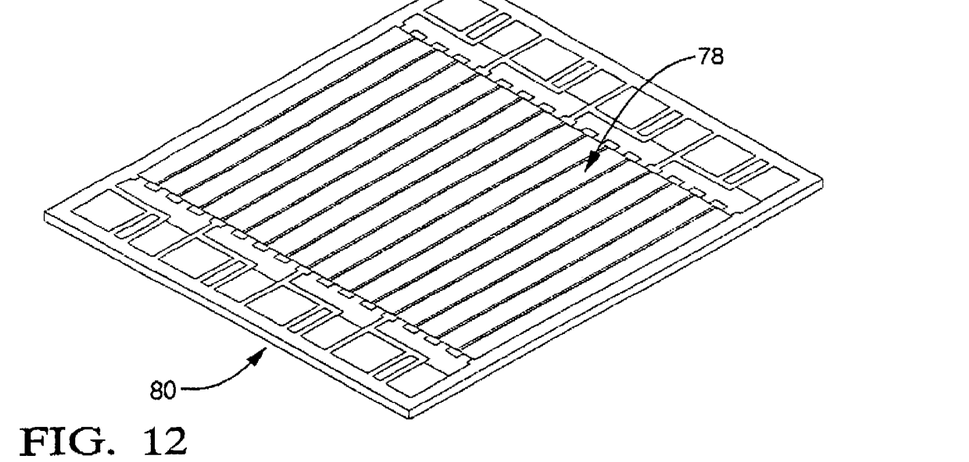
FIG. 12 is a perspective view showing the gas distribution layer in combination with a manifold frame.

Alternately, as seen in FIG. 10, the spatial variance in the resistance to gas flow offered by the sheet may be achieved by spatially varying the thickness of the respective sheet and, specifically, by providing alternating thick sections 178a and thin sections 178b. As a further alternative, and as seen in FIG. 11, the spatial variation in the sheet may be provided by compressing spaced strips along the sheet to form alternate thick high porosity uncompressed sections 278a and thin compressed low porosity sections 278b. In either the FIG. 10 or the FIG. 11 alternative construction, epoxy strips or beads 93 may be positioned in the grooves between the thick and thin sections of the layer.

As a further alternative, the segmented gas distributor layer, rather than being constituted by a single segmented foam sheet, may be constituted by a plurality of individual foam strips or segments arranged in serial, side-by-side relation with appropriate delineations between the separate strips.

Each anode manifold 80 (FIGS. 6 and 13) is preferably formed of a molded plastic material and has an open frame rectangular configuration. Each manifold 80 includes an inlet manifold strip portion 80a, an outlet manifold strip portion 80b, and end strip portions 80c and 80d.

Figure 13:
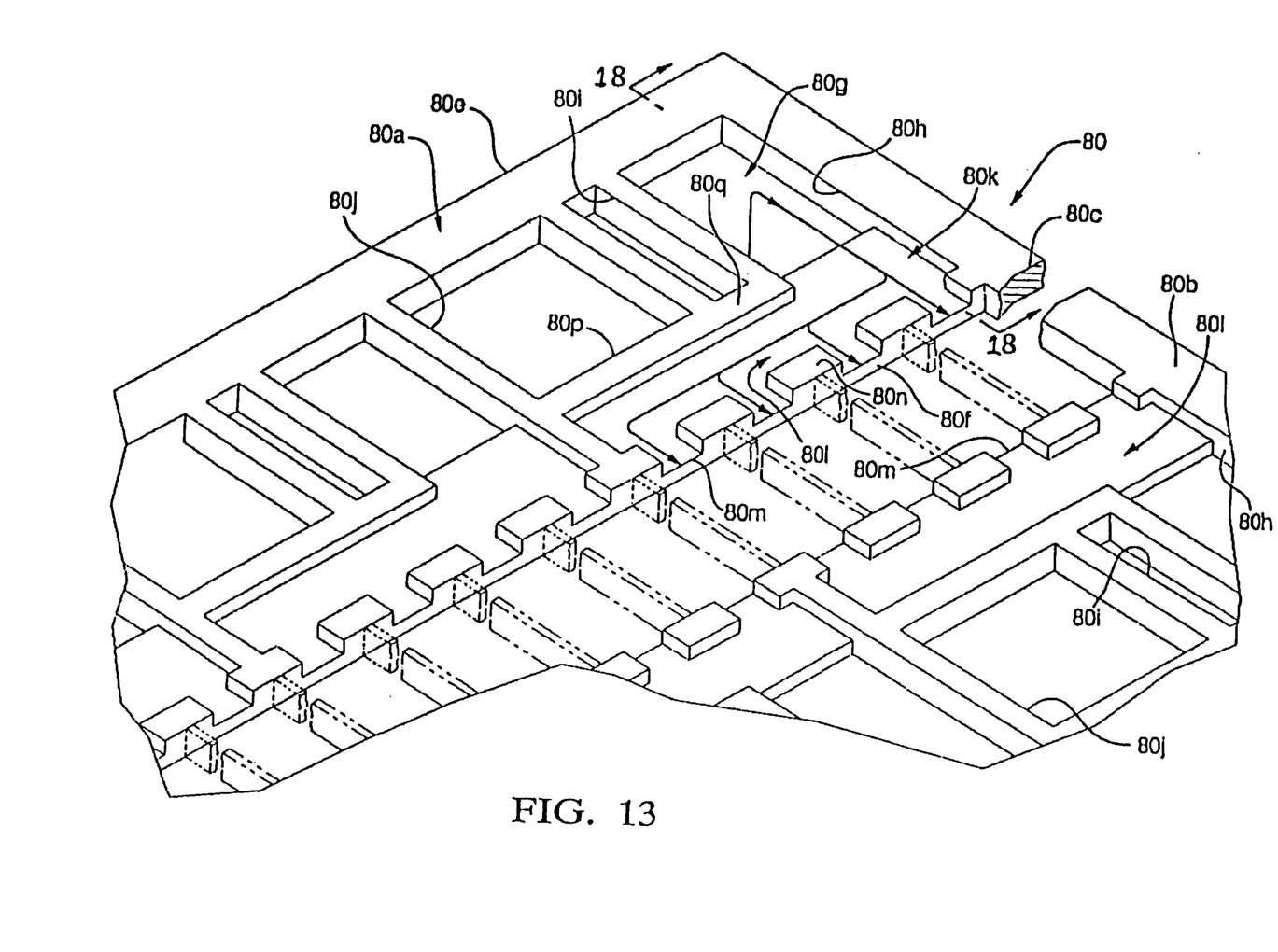
FIGS. 13, 14, and 15 are fragmentary perspective views of manifolds utilized in the fuel cell.

Each inlet manifold strip portion 80a includes an outboard edge 80e and an inboard edge 80f which define a lateral margin therebetween having an outboard portion 80g proximate the outboard edge thereof with a plurality of serially arranged vertical inlet ports or passages 80h, 80i, and 80j formed in a repeating pattern for delivery of respective fluids, including reactant gases, to the respective segments of the gas distribution layers. An inboard portion 80k of the lateral margin proximate the inboard edge thereof defines a horizontal passage 80f for communication with the inlet ends of the segments of the gas distribution layers. Passage 80l is in turn divided into a plurality of horizontal sub-passages 80m by spaced lands 80n with each sub-passage arranged for alignment with and communication with the inlet end of a respective segment of a gas distribution layer. Communication between vertical inlet passage 80j and passage 80l is blocked by a wall 80p, communication between the vertical inlet passage 80i and the passage 80l is blocked by an inlet wall 80q, but inlet passage 80h is open to horizontal passage 80l so that the fluid passing upwardly through passage 80h is free to move along horizontal passage 80l and through individual sub-passages 80m for coaction with respective segments of the gas distribution layer. The subset of vertical inlet passages 80h, 80i, and 80j coacting with horizontal passage 80l is repeated along the length of the inlet manifold strip portion with the number of repetitions depending upon the overall length of the inlet manifold portion.

The outlet manifold portion 80b is similar in layout to the inlet portion 80a and specifically includes subsets of inlet passages 80h', 80i', and 80j', horizontal passage 80l', and horizontal sub-passages 80m'.

Figure 14:
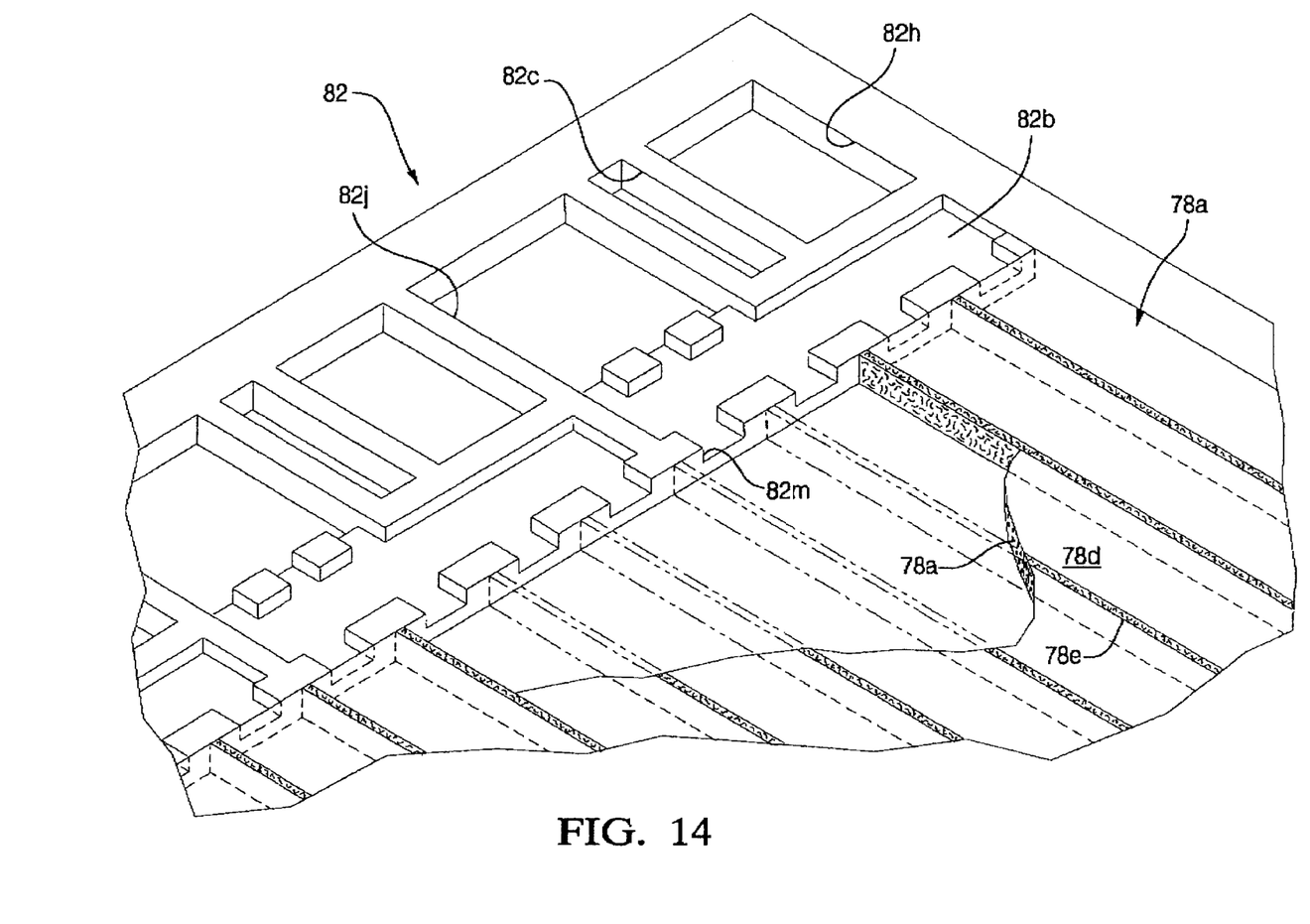

Each cathode manifold 82 is identical to the anode manifolds 80 with the exception that (as seen in FIG. 14), communication is established between vertical passage 80j/80j' and horizontal passage 80l/80l' while communication is blocked between vertical passage 80h/80h' and horizontal passage 80l/80l' and between vertical passage 80i/80i' and horizontal passage 80l/80l'.

Figure 15:
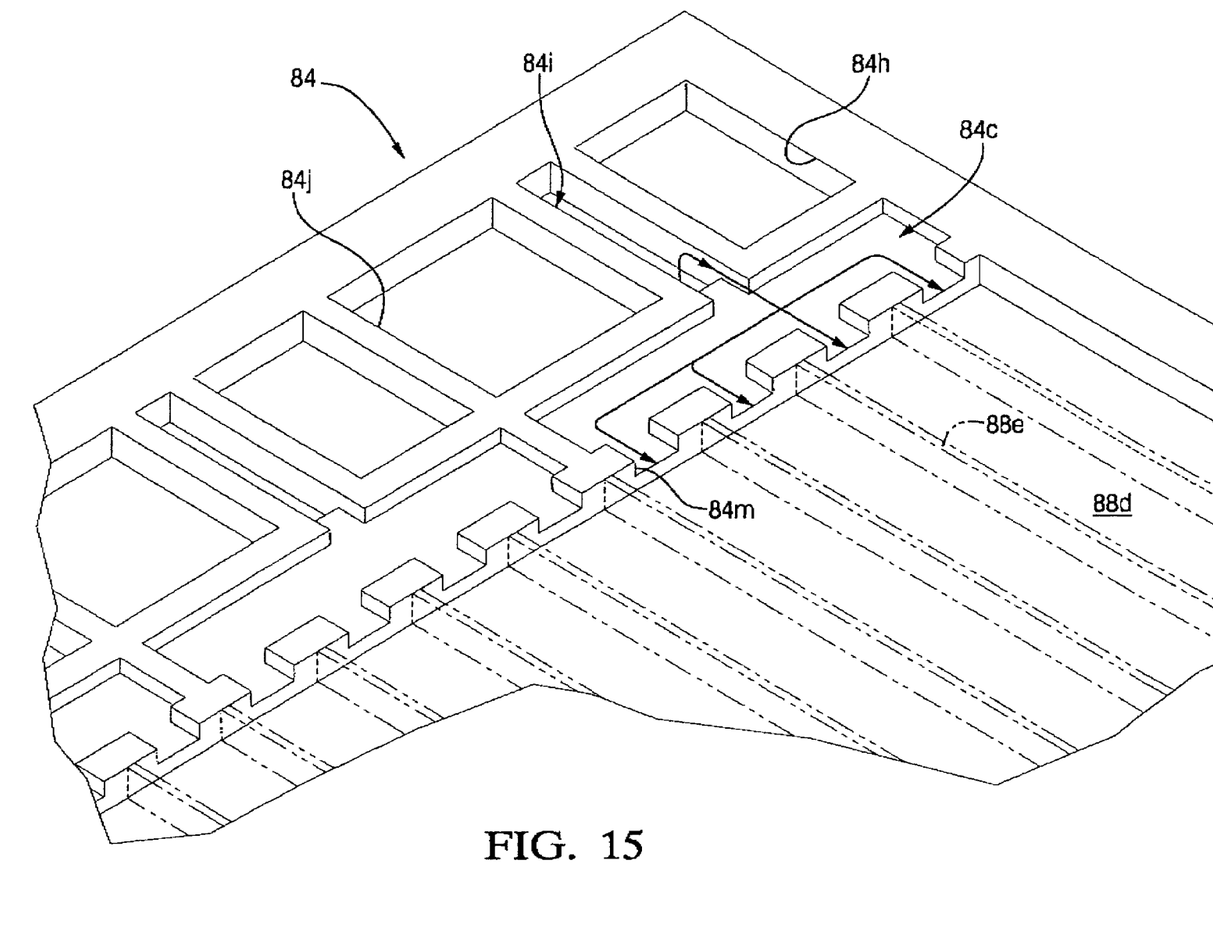

Each cooling manifold 84 is conceptually identical to the cathode and anode manifolds 80 and 82 with the exception that (as seen in FIG. 15) communication is established between vertical inlet passage 84i/84i' and horizontal passage 84l/84l' while communication is blocked between vertical inlet passage 84j/84j' and passage 84l/84l' and between vertical inlet passage 84h/84h' and passage 84l/84l'.

The cooling manifold is bonded directly to a separator plate on both the top and bottom of the manifold. The anode and cathode manifolds are bonded to a separator plate on the side of the manifold with the passages. The opposite side has a seal bonded to it which presses against the MEA or the opposing manifold.

Figure 18:
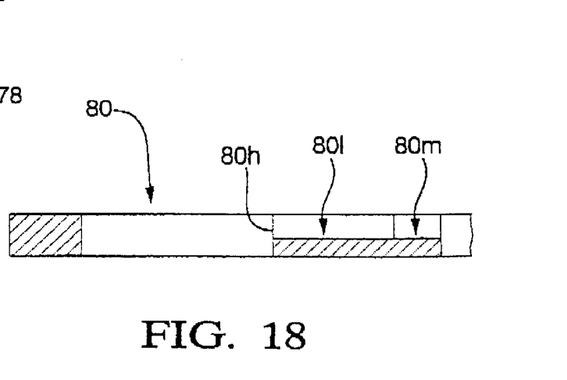
FIG. 18 is a cross-sectional view taken on line 18—18 of FIG. 13.

In each of the manifolds, and as best seen in FIG. 18, the vertical passages h, i, and j (and h', i', and j' pass completely through the respective manifold section whereas the passage i/i' and the sub-passages m/m' are formed by removing the upper half of the thickness of the respective manifold section.

Each shim or separator plate 86 has a rectangular configuration and is preferably formed of a metallic material such as stainless steel or titanium. Each shim 86 includes a plurality of subsets of vertical passages 86h, i, and j (and 86h', i', and j') along respective opposite longitudinal edges corresponding in size and spacing to the subsets of vertical passages in the cathode, anode, and cooling manifolds and in the MEAs.

It will be understood that subsets of vertical passages h, i, and j (and h', i' and, j') in each of the manifolds, in the MEAs, and in the shims correspond in size, shape, and spacing and are vertically aligned to define a plurality of subsets of passageways H, I, J (and H', I', and J') extending vertically through opposite edges of the fuel cell stack, and it will be further seen that the sizes of the passages h, i, and j (and h', i', and j') vary in accordance with the capacity requirements of the various fluids being processed through these passages. Specifically, the passages j/j', which are intended to process cathode air, are relatively wide; the passages l/l', which are intended to process a cooling liquid, are relatively narrow; and the passages h/h', which are intended to process anode hydrogen, have an intermediate width.

Each cooling layer 88 is identical to the gas distribution layers 78 and, specifically, includes a plurality of generally parallel segments 88a each extending from a first edge 88b of the layer to a second edge 88c of the layer whereby to define a plurality of generally parallel porous coolant paths extending across the fuel cell stack.

Collector plates 90 are of known configuration and construction and serve to collect cumulative electrical energy generated by the cells in the fuel cell stack for distribution to a suitable load such as the vehicular motor 64 in FIG. 2.

Insulator plates 91 serve to electrically isolate the end plates from the collector plates if the end plates are made from an electrically conductive material. If the end plates are not conductive, the insulator plates may be eliminated.

End plates 92 serve to provide upper and lower plates for the fuel cell stack whereby a compressive load may be suitably applied to the stack (as, for example, by tie bolts or clamps) to ensure that a proper interface is maintained between all of the layers of the stack, to ensure proper distribution of fluids within the stack, and to ensure proper electrical conductivity within the stack.

Figure 6:
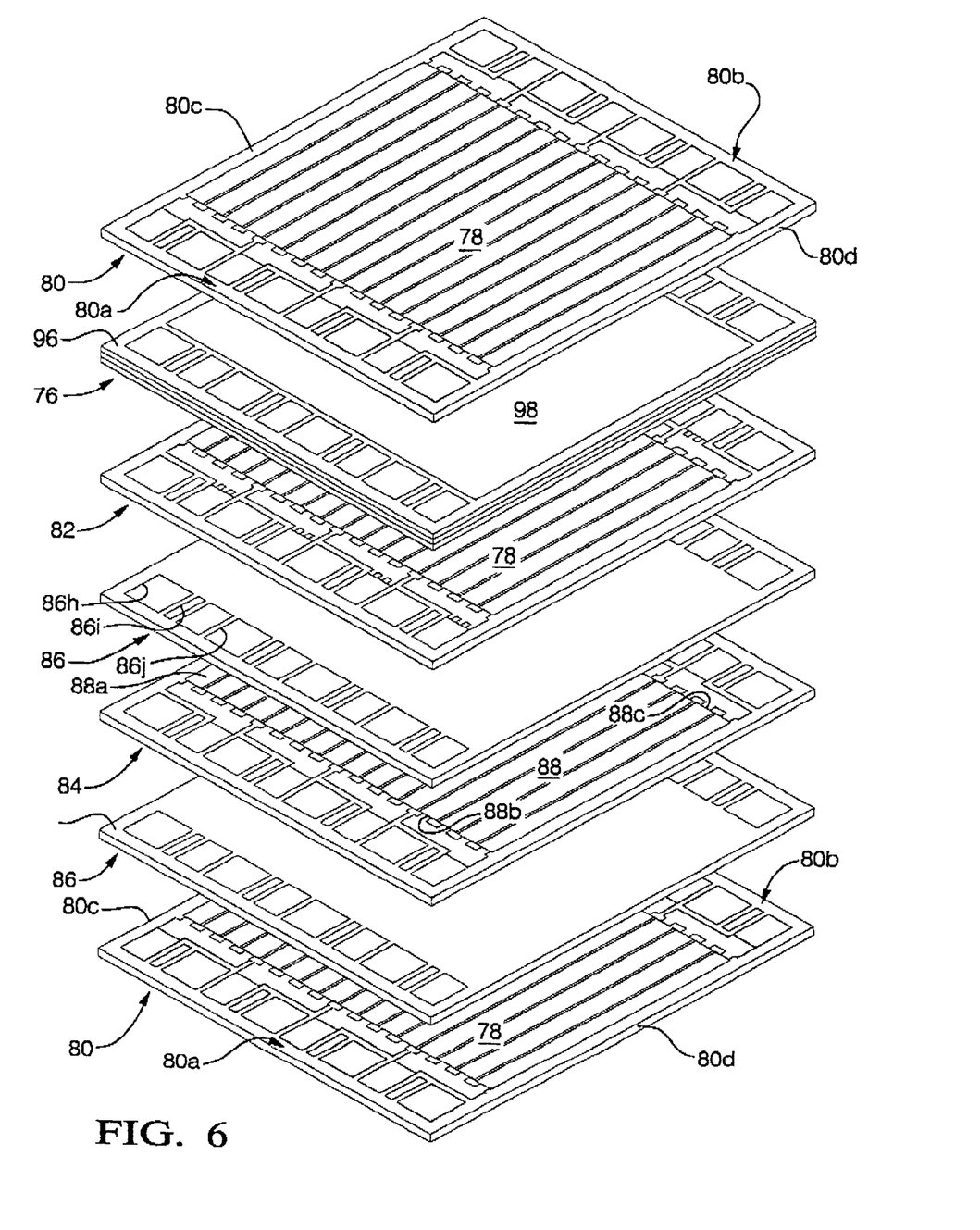
FIG. 6 is an exploded view of the fuel cell.

In the assembled relation of the various components of the stack, and as best seen in FIGS. 4 and 6, a gas distribution layer 78 is positioned within each anode manifold 80; a gas distribution layer 78 is positioned within each cathode manifold 82; a cooling layer 88 is positioned within each cooling manifold 84; shims 16 flank the cooling layers to preclude mixing of the reactant gases and the cooling fluid while maintaining conductvity through the stack; the vertical passage subsets h, I, and j (and h', I' and j') in each of the layers are aligned to define subsets of vertical passageways extending upwardly (H, I, and J) and downwardly (H', I', and J') through the stack on either side of the stack; each segment 78a of each gas distribution layer is positioned with its inlet end 78f in alignment with a respective sub-passage 80m/82m of the respective manifold and with its outlet and 78g in respective alignment with a sub-passage 80m'/80m' of the respective manifold; each segment 88a of each cooling layer 88 is respectively aligned at its inlet end with a sub-passage 84m of the respective coolant manifold and at its outlet end with a sub-passage 80m' of the respective coolant manifold, and the major face of each gas distribution layer 78 remote from the adjacent MEA may be bonded to the confronting face of the adjacent shim 86. Bonding may be accomplished by sintering, brazing, or by using conductive adhesives.

In operation, hydrogen is passed upwardly through the vertical passageway H, air is passed upwardly through the vertical passageway J, and a cooling fluid such as glycol/water mix, Freon, or methanol is passed upwardly through the vertical passageway I.

The hydrogen passing upwardly through passageway H is diverted at each anode manifold layer for passage through the horizontal passage 80l and the sub-passages 80m and thereafter through the respective segments 78a to the outlet manifold strip where the hydrogen affluent passes through the sub-passages 80m', the horizontal passage 80l', and downwardly through the passageway H' for delivery via the line 26 to the combustor 42. As the hydrogen moves from the inlet ends of the segments 78a to the outlet ends, the hydrogen is confined by the low porosity strips 78e essentially to the respective segments 78a so that little or no cross migration occurs between the parallel segments whereby to ensure an essentially uniform distribution of hydrogen across the surface of the underlying anode electrode 98 irrespective of unavoidable and significant variations in the porosity of the foam material of the foam media, whereby to maximize the generation of electrical energy occurring by virtue of the interaction between the hydrogen and the anode electrode. The gas flow distribution over the respective catalyst layers is essentially uniform since the resistance to flow is the total restriction along each segment and thus variations in porosity are averaged over the length of a segment rather than allowing a local perturbation to effect the entire flow field.

Simultaneously, cathode air is passed upwardly through passageway J and the upwardly moving cathode air is diverted at each cathode manifold layer by virtue of the open communication between the passages 82j and the horizontal passage 82l whereby the air moves through horizontal passage 82l and through sub-passages 82m for passage through the individual foam segments 78a and subsequent discharge through the discharge passageway J' whereafter the oxygen depleted air is collected via conduit 28 for suitable distribution in the manner previously described. Again, the low porosity strips 78e between the high porosity strips 78d serve to preclude cross migration of air between the adjacent strips and thereby ensure that a uniform supply of air and oxygen is distributed to all areas of the overlying cathode electrode 100 whereby to maximize the generation of electrical energy created by the reaction of the air with the electrode 100 irrespective of the inherent and significant porosity variations in the foam material of the gas distribution layer.

With respect to both the hydrogen and oxygen distribution, the narrow width of the strips 78e as compared to the segment 78d ensure that virtually all of the area of the respective MEA electrode will be exposed to the respective reactant gas with the result that electrical energy generation is maximized. And since reactant gas will diffuse into the narrow divider strips 78e because they are porous, even the small electrode areas beneath the strips will generate electrical energy, whereby to further maximize the generation of electrical energy in the cell.

Simultaneously, cooling fluid moves upwardly through passageway I and is diverted at each coolant manifold layer by virtue of the communication between the passages 84i and the horizontal passage 84l whereby the coolant flows through the sub-passages 84m and through the individual segments 88a of the coolant layer for collection at the outlet strip of the coolant manifold and downward discharge through passageway I' for suitable discharge or recycling. Again, the low porosity strips 88e between the high porosity strips 88d ensure a uniform distribution of the cooling fluid over the adjacent surfaces of the overlying and underlying shims whereby to ensure uniform cooling of the total area of the adjacent cells.

Figure 16:
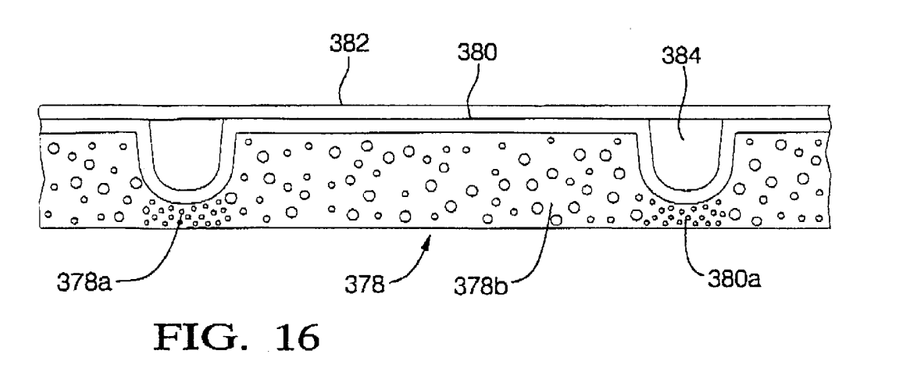
FIG. 16 is a cross-sectional view showing an alternate form of gas distribution layer with built-in cooling.

In the alternate gas distribution layer construction seen in FIG. 16, the foam layer 378 is selectively compressed at spaced intervals to provide high density and low porosity regions 378a separating high porosity regions 378b. A plate 380 of conductive material is positioned over the foam 378 with individual spaced convolutions 380a of the plate respectively overlying the compressed low porosity regions 378a, and a shim or separator plate 382 is positioned over plate 380 to define transversely extending coolant path channels 384 overlying the compressed regions of the foam layer. This arrangement has the advantage of providing coolant passages at the same level as the gas distribution layer and thereby eliminating the need to provide a separate layer and a separate manifolding to provide the cooling for the stack.

Figure 17:
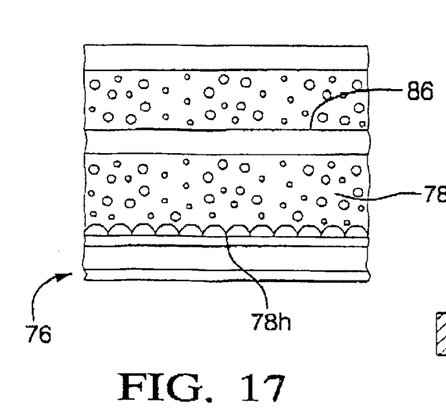
FIG. 17 is a fragmentary cross-sectional view showing the interface of the gas distribution layer with the MEA and with a separator plate utilized in the fuel cell stack.

The invention will be seen to provide a fuel cell which is lighter, smaller, and less expensive than the comparable prior art fuel cells without any sacrifice in the electrical energy outputted by the fuel cell. Specifically, the substitution of a foam gas distribution layer, in place of the prior art metallic bipolar plate with its serpentine lands and channels, reduces both the weight and volume of the fuel cell. The ability of the foam gas distribution layer to distribute gas over essentially the entire area of the membrane, as opposed to only the area exposed to the grooves of the serpentine channels of the prior art bipolar plates, further allows the elimination of the prior art graphite paper or cloth between the bipolar plate and the membrane since the gas distribution function of this cloth is now satisfied by the foam layer and since the function of this cloth in preventing the membrane from collapsing into the channels and blocking the flow of gas is now satisfied by the foam since the span between the individual contact points 78 between the foam and the membrane (as best seen in FIG. 17) is substantially less than the span between the land area separating the individual groove sections of the serpentine channels of the prior art. The elimination of this cloth further reduces the volume and weight of the fuel cell and further reduces the cost of the fuel cell. The bonding of the foam to the adjacent shim along one major face of the foam layer in combination with the multi-point and total electrical contact between the other major face of the foam layer and the MEA has the effect of lowering the contact resistance across the cell with the result that the compressive loading required to maintain electrical conductivity through the cell is minimized and the size and strength of the end plates may be minimized with consequent savings in cost, weight, and volume. The reduction in the amount of compressive loading required also allows the use of lighter and less expensive materials for the end plates such, for example, as a suitable plastic. In fact, utilizing the invention technology, a fuel cell stack has been constructed and tested which is significantly smaller, lighter, and less expensive than prior art fuel cells without reducing the electrical energy output level per unit area of fuel cell.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel cell comprising:
   a membrane electrode assembly having a proton transmissive membrane, a catalytic cathode layer formed on a first face of said membrane, and a catalytic anode layer formed on a second face of said membrane opposite said first face;
   first and second separator plates, each of said separator plates being non-porous and electrically conductive;
   a first gas distribution layer including:
   a first porous media having a first major face in contact with said cathode catalytic layer and a second major face opposite said first major face in contact with said first separator plate, said first porous media being divided into a plurality of generally parallel segments extending from a first minor face to a second minor face to define a plurality of transverse flow paths therethrough;

a first manifold having an inlet portion providing fluid communication from an inlet passage formed in said first manifold to said first minor face of said first porous media and an outlet portion providing fluid communication from said second minor face of said first porous media to an outlet passage formed in said first manifold; and a second gas distribution layer including:
a second porous media having a first major face in contact with said anode catalytic layer and a second major face opposite said first major face in contact with said second separator plate, said second porous media being divided into a plurality of generally parallel segments extending from a first minor face to a second minor face to define a plurality of transverse flow paths therethrough;

a second manifold having an inlet portion providing fluid communication from an inlet passage formed in said second manifold to said first minor face of said second porous media and an outlet portion providing fluid communication from said second minor face of said second porous media to an outlet passage formed in said second manifold.

2. A fuel cell according to claim 1 wherein the first and second porous media comprise a foam media.

3. A fuel cell according to claim 2 wherein the foam media comprises an open cell foam media.

4. A fuel cell according to claim 2 wherein the foam media comprises a conductive graphite foam media.

5. A fuel cell according to claim 2 wherein the foam media comprises a conductive metallic foam media.

6. A fuel cell according to claim 1 wherein:
each gas distribution layer comprises a sheet of the porous media; and the segments of each distribution layer are defined by spatially varying the resistance to gaseous flow offered by the respective sheet.

7. A fuel cell according to claim 6 wherein the resistance to flow is spatially varied by spatially varying the porosity of the respective sheet.

8. A fuel cell according to claim 6 wherein the resistance to flow is spatially varied by spatially varying the thickness of the respective sheet.

9. A fuel cell according to claim 6 wherein the resistance to flow is spatially varied by spatially varying the thickness and the porosity of the respective sheet.

10. In a fuel cell of the type having a membrane electrode assembly with a catalytic layer formed on one face and a gas distribution layer having a major face in contact the catalytic layer, the gas distribution layer comprising:
a porous foam media having an inlet minor face, an outlet minor face, and a plurality of generally parallel segments extending from the inlet minor face to the outlet minor face to define a plurality of generally parallel porous reactant flow paths extending across the catalytic layer; and
a manifold including a inlet manifold positioned adjacent the inlet minor face for delivering a reactant gas through the inlet minor face to the plurality of generally parallel porous reactant flow paths and an outlet manifold strip positioned adjacent the outlet minor face for receiving the reactant gas from the plurality of generally parallel porous reactant flow paths through the outlet minor face.

11. A gas distribution layer according to claim 10 wherein the foam media comprises an open cell foam media.

12. A gas distribution layer according to claim 10 wherein the plurality of generally parallel segments of the distribution layer is defined by spatially varying the resistance to flow offered by the sheet.

13. A fuel cell according to claim 12 wherein the resistance to flow is spatially varied by spatially varying the porosity of the respective sheet.

14. A fuel cell according to claim 12 wherein the resistance to flow is spatially varied by spatially varying the thickness of the respective sheet.

15. A fuel cell according to claim 12 wherein the resistance to flow is spatially varied by spatially varying the thickness and the porosity of the respective sheet.

16. A gas distribution layer according to claim 10 wherein the foam media comprises a conductive graphite foam media.

17. A gas distribution layer according to claim 10 wherein the foam media comprises a conductive metallic foam media.

18. The gas distribution layer according to claim 10 wherein each of the inlet manifold strips and the outlet manifold strips comprise a vertical passage for delivery of a reactant gas to the manifold and a horizontal passage providing fluid communication between said vertical passage and said minor face of said porous foam media.

19. The gas distribution layer according to claim 18 wherein said horizontal passage is divided into a plurality of sub-passages with each sub-passage aligned with and communicating with an inlet end of a respective segment of said plurality of generally parallel porous reactant flow paths.

20. A fuel cell comprising:
a proton transmissive membrane having a catalytic anode layer on a first face of said membrane and a catalytic cathode layer on a second face of said membrane opposite said first face;
an anode gas distribution layer having a porous foam anode media in contact with said catalytic anode layer and an anode manifold structure including an anode inlet manifold positioned adjacent an inlet minor face of said porous foam anode media and having a plurality of anode inlet passages and cathode inlet ports formed in a repeating pattern in a first lateral margin of said anode gas distribution layer, a horizontal passage providing fluid communication between each of said anode inlet ports and the minor face of said porous foam anode media while preventing fluid communication between each of said cathode inlet ports and said porous foam anode media, and an anode outlet manifold positioned adjacent an outlet minor face of said porous foam anode media and having a plurality of anode outlet ports and cathode outlet ports formed in a repeating pattern in a second lateral margin of said anode gas distribution layer, a horizontal passage providing fluid communication between the minor face of said porous foam anode media and each of said anode outlet ports while preventing fluid communication between said porous foam anode media and each of said cathode ports;
a cathode gas distribution layer having a porous foam cathode media in contact with said catalytic cathode layer and an cathode manifold structure including a cathode inlet manifold positioned adjacent an inlet minor face of said porous foam cathode media and having a plurality of anode inlet ports and cathode inlet ports formed in a repeating patter in a first lateral margin of said cathode gas distribution layer, a horizontal passage providing fluid communication between each of said cathode inlet ports and the minor face of said porous foam cathode media while preventing fluid communication between each of said anode inlet ports and said porous foam cathode media, and a cathode outlet manifold positioned adjacent an outlet minor face of said porous foam cathode media and having a plurality of anode outlet ports and cathode outlet ports formed in a repeating pattern in a second lateral margin of said cathode gas distribution layer, a horizontal passage providing fluid communication between the minor face of said porous foam cathode media and each of said cathode outlet ports while preventing fluid communication between said cathode gas distribution layer and each of said anode outlet ports; and a conductive, non-porous separator plate in contact with at least one of said anode gas distribution layer and said cathode gas distribution layer.

21. A fuel cell according to claim 20 further comprising a coolant distribution layer having a porous media in contact with said separator plate and a coolant manifold structure including a coolant inlet manifold positioned adjacent an inlet minor face of said porous media and having a plurality of anode inlet ports, cathode inlet ports and coolant inlet ports formed in a first lateral margin of said coolant distribution layer, a horizontal passage providing fluid communication between each of said coolant inlet ports and the minor face of said porous media while preventing fluid communication between each of said cathode and anode inlet ports and said porous media, and a coolant outlet manifold positioned adjacent an outlet minor face of said porous media and having a plurality of anode outlet ports, cathode outlet ports and coolant outlet ports formed in a second lateral margin of said coolant distribution layer, a horizontal passage providing fluid communication between the minor face of said porous media and each of said coolant outlet ports while preventing fluid communication between said porous media and each of said cathode and anode inlet ports.

* * * * *